March 6, 1945. W. C. HESS ET AL 2,370,726
VEHICLE FRAME
Filed March 13, 1942 2 Sheets-Sheet 1
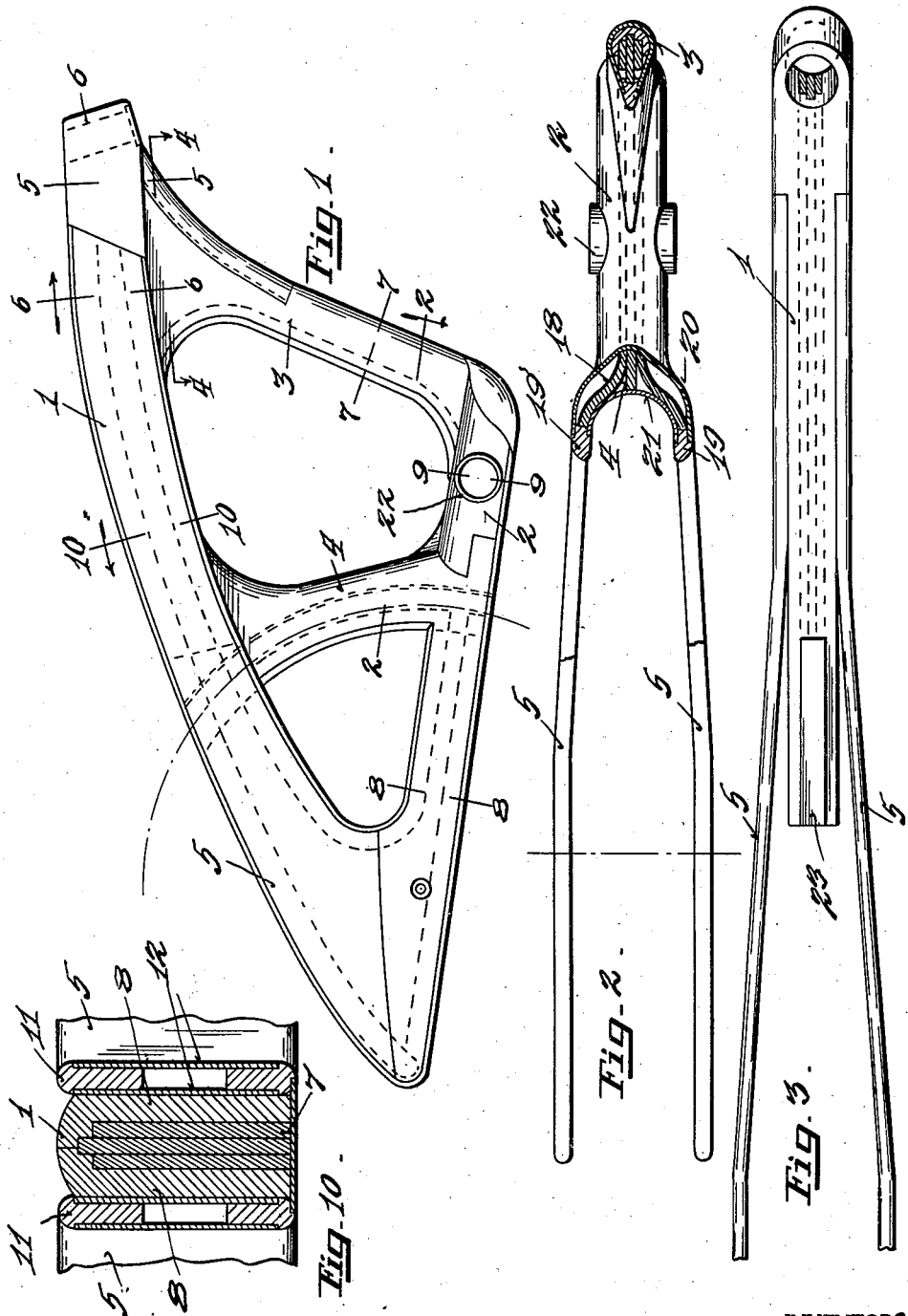
INVENTORS
Willard C. Hess
Samuel Glueck
BY
Oliver B. Kaiser
Atty.

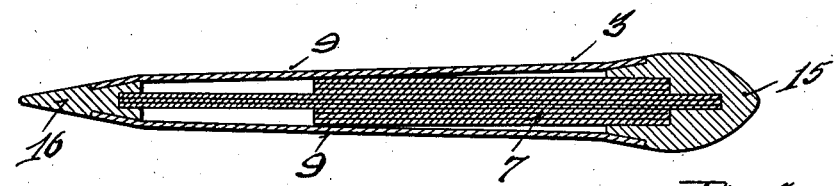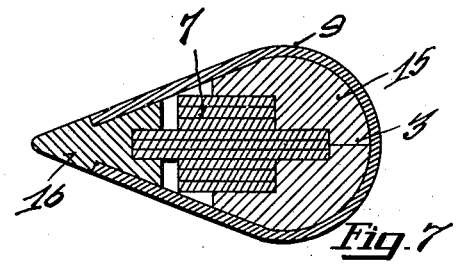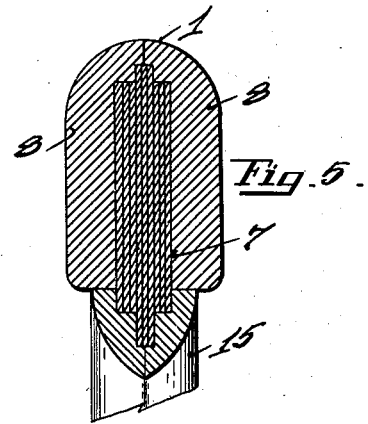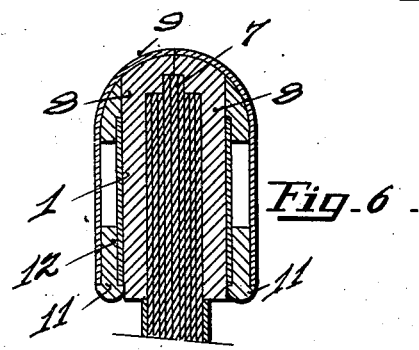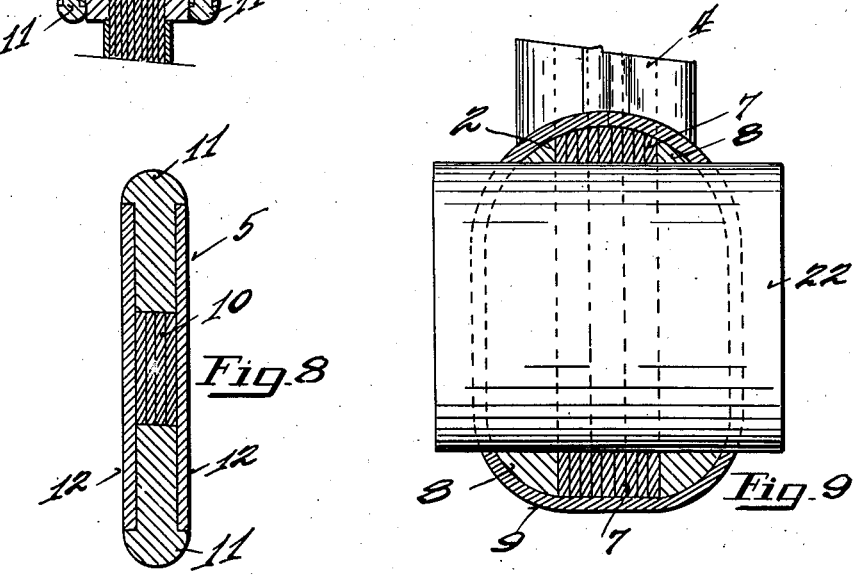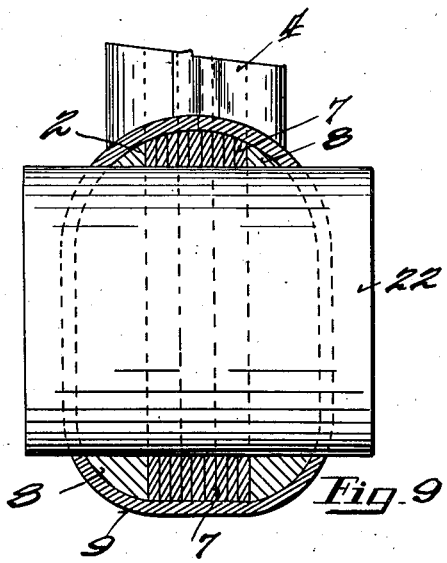

Patented Mar. 6, 1945

2,370,726

UNITED STATES PATENT OFFICE 2,370,726

VEHICLE FRAME

Willard C. Hess, Wyoming, and Samuel Glueck, Cincinnati, Ohio

Application March 13, 1942, Serial No. 434,542

7 Claims. (Cl. 280—281)

This invention relates to improvements in vehicle frames, particularly as constituted for the main or supporting frame of a bicycle type of vehicle, to enhance its riding qualities, lessen its liability to distortion, materially increasing its strength over prevailing constructions and methods of manufacture, of extreme lightness in weight and of a composite or plural ply material enabling its fabrication mainly from materials other than metal, and in which portions thereof may be reinforced or strengthened by an increase in ply of the same or different kinds of material.

An object of the invention is to produce a vehicle frame, particularly for a bicycle type, of a laminated or composite structure embodying sheet material or sheets and an intermediate filler material and solidly bonded together.

Another object is to provide a vehicle frame having a web or core of laminated or composite material or a composite sheet or strips of laminar material vertically disposed, with coped or beaded edges or margins for reinforcement and to give added dimension and definition thereto esthetically and to increase its durability.

Another object is to produce a vehicle frame composed of laminae of the same or different stability and of increased numbers varied for different portions or sections of the unit for a proportional increase in frame strength and to obtain improved riding qualities due to the natural resiliency and absorption qualities of the laminae.

The drawings primarily exemplify a selected example of vehicle frame of the bicycle type and commonly resignated "safety" style in which the major or body portion constitutes a web or series of webs normally disposed in a vertical or perpendicular plane with relation to the ground with its forward end extended and mounting a ferrule or sleeve for connecting with and swiveling a stem of a wheel supporting fork for journaling the front ground wheel, the stem having a steering handle fixed to its upper end. The upper bar of the frame, at its rear end, sustains a seat and the lower bar journals a crank for vehicle propulsion from which the frame bifurcates to divide into a pair of limbs, as laminar extensions of the frame for straddling a rear ground wheel and to which the wheel is journaled, so that the general characteristics of a conventional tubular fabricated bicycle frame "safety" style are maintained.

The bar and limb portions of the frame may be blocked out from a laminated sheet to skeletonize the same and minimize its broadside area, making it less retarding to side wind pressures, and the blockout, configurated to obtain uniqueness in design and contribute to the constructural qualities for utility.

The weight or gravity of the laminae and their relative number for different portions of the frame structure may be varied, depending upon the physical structure of the materials used and upon an adhesive or bonding material to achieve a definite structural characteristic. This may involve various processes or methods of fabrication and likewise applied to the selected form herein disclosed generic to structure, so that any process or method of fabrication is separate and distinct hereof.

In the construction of various portions or sections of the frame, different grades and kinds of fillers may be used which may serve to line and shape outer laminae of an assembly. They also contribute to the strength factor of the entire structure and may be varied in thickness, shape or composition for proportionate strength.

Other features and advantages of the invention will be more fully set forth in the description of the accompanying drawings, in which:

Figure 1 is a side elevation of the improved bicycle frame for straddle riding.

Figure 2 is an enlarged section on line 2—2, Figure 1.

Figure 3 is a top plan view of the frame.

Figure 4 is an enlarged section on line 4—4, Figure 1.

Figure 5 is an enlarged section on line 5—5, Figure 1.

Figure 6 is an enlarged section on line 6—6, Figure 1.

Figure 7 is an enlarged and full size section on line 7—7, Figure 1.

Figure 8 is an enlarged section on line 8—8, Figure 1, of one of the limbs of the rear fork portion of the frame.

Figure 9 is an enlarged section on line 9—9, Figure 1.

Figure 10 is an enlarged section on line 10—10, Figure 1.

The present invention being directed particularly to the structure of a vehicle frame of the bicycle (safety) type, the drawings only depict the frame. While such parts as the guards, wheels and front wheel journal fork likewise lend themselves to laminated types of structures, disclosure thereof is omitted for classifying purposes as separate and distinct hereof. This also applies to the propelling mechanism and other details employed in the make-up of the vehicle and which may be of well known conventional construction.

The frame in general outline characteristically patterns in side elevation and ordinarily termed "diamond shape," having an intermediate strut or saddle pillar, with the elements of the frame possessing a materially increased depth measurement over the ordinary metal tube frames.

In the build-up of the frame greater latitude is possible in its lines and curves to give increase in strength and provide material alteration esthetically.

The styling is functional not only to enhance the appearance of the vehicle, but also to contribute to its constructional qualities.

Referring to the drawings, the body of the frame preferably comprises a top beam or bar 1 and a bottom or base beam 2 extending longitudinally of the frame, spaced and connected at their forward ends by a truss beam or bar 3 and at the rear ends by a strut or saddle pillar 4 from which the body bifurcates, to provide a pair of companion relatively spaced limbs 5—5 for straddling and journaling a rear wheel. The top beam, at its forward end, extends beyond its juncture with the truss beam 3 and has a sleeve or bushing 6 fixed or embedded therein for mounting and journaling a steering post as a part of a front wheel carrying fork, and its rear end is of a form slidably and adjustably mounting a seat or saddle.

The frame elements are of composite structure, varying relatively in detail of construction, although primarily each contains a central web or core 7 preferably composed of a plurality of composite sheets or strips of laminar material unitarily bonded together, and may also be defined as a composite unit of laminar material. The plural strip form, in composing the body of the frame of bar or beam-like elements, permits the web to be easily fabricated from relatively different widths and lengths of strips for staggering the ends and edges, and therefore provide for connecting the beams in a mortise and tenon fashion, securely joining and unitarily combining the same, and to efficiently bind the edges.

It is recognized, however, that the frame may be formed as a unitary element from either a single or plurality of bonded sheets of ply board or laminar material cut out to a selected outline and centrally or intermediately blocked out to skeletonize the same and for some styles and/or classes of vehicles may be left in the solid, which is more or less a matter of design.

The beam or bar form of frame is used principally to conserve material and reduce waste, particularly for the pattern, design or style illustrated for the body portion of the frame. The rear wheel straddling limbs of the frame for the tail end thereof are more dominantly solid, providing a minor cut out portion to furnish an opening, particularly through one of the limbs for passage of the sprocket chain or propulsion means connecting with the rear wheel.

The laminae of the web may be of various grades and kinds of material, as a fibrous material conventionally employed in the manufacture of wood or paper ply boards or sheets, and in some instances the intermediate layer or layers are of a composition or filler material. The webs, therefore, are built up of laminae of a different material and of different strength sections with the number of layers varying at various points to give increased proportionate frame strength. The weight or the gravity of the laminae may be varied, depending upon the physical construction of the materials employed and upon the adhesive or bonding material.

The method of fabrication of the laminar beams or frame, whether blanked out of flat sheets or prepared from pre-shaped forms involving different processing, of which detailed description is omitted, is regarded as separate from the improvement herein which is confined to the vehicle frame as an article of manufacture.

The laminar web of both the upper and lower beams respectively are preferably enclosed or covered with layers or strips 8—8 of wood or other material in a solid form adhesively bonded thereto, imbedding the web, the web thereby constituting a core for the beams or bars. The beams or bars, as for the base and truss beams 2, 3, further may be enclosed or covered by a pliable layer 9.

The upper beam 1 and the rear portion of the lower base beam 2, at the relative opposite sides thereof, each is provided with correspondingly formed sections or extensions of laminar material to form the pair of spaced limbs 5—5 to bifurcate and fork the frame rearwardly of the body for straddling and journaling the rear wheel of the vehicle with the outlines of the limbs tapering from the union with the body portion of the frame, and they may be said to be of V-shape longitudinally for the particular design disclosed thereby, with the body given an approximate diamond shaped outline configuration to the frame. The body and limbs at the bifurcation of the frame are further joined by the strut or saddle pillar 4.

The limbs, as shown in cross-section Figure 8, are representative of a composite or laminar construction preferably composed of a central laminar web or core section 10 joining at its opposite ends to strips 11—11 of a solid material and facing layers 12—12 recessed into the sides of the end strips for the opposite sides of the limbs, all bonded or integrated together into a laminar structure with the outer end of the end strips providing a beading for the edges of the limbs. The limbs have an upper longitudinal portion or extension parallel with the relative opposite side of the upper beam and form a part thereof, thereby materially strengthening the same.

The front truss beam 3, as illustrated in cross-section Figure 7, comprises a central laminar core or web 7, binding strips 15 and 16 of solid material respectively joining with the relative opposite ends of the web or core 7 in a mortise and tenon connection, and a pliable covering or facing layer 9 having its opposite ends stressed into the binding or beading strip 16.

The strut or saddle pillar 4 is of channel form in cross-section to bifurcate the rear end of the body of the frame, and as illustrated in Figure 2, comprises a central web or core 18 with a portion of the laminae thereof for the outer sides relatively diverging outwardly from one or the rear end to respectively merge and join with the limbs 5—5. The ends of the diverging portions, each respectively, is joined to a beading strip 19 of solid material and the web or core enclosed or covered by respective pliable layers 20, 21 having their relative opposite ends recessed in and bonded to the respective opposite sides of the beading strip 19.

The lower base beam 2 has a bushing 22 engaged through an aperture therein and suitably, rigidly fixed thereto for carrying an anti-friction bearing and crank shaft of the vehicle propulsion means, and correspondingly the limbs, each respectively, is provided with a bushing or other means for the journals of the rear wheel.

The upper beam 1 is elongated to extend between the diverging portion of the limbs 5 and provides a supporting tongue 23 for slidably, adjustably mounting a seat or saddle thereon. This locates the seat at a point for greatest rider comfort and somewhat closer to the center of gravity than as heretofore located, giving a degree of more perfect balance and greater ease of control.

In the construction of the various sections different fillers may be used to fill up any interstices or abruptness to form a compact and smooth surface assembly and thereby also contribute to the strength and shape of the element, and the composition of the filler may be varied to obtain proportionate strength.

The outer laminae can be surface finish coated or base coated, offering advantages otherwise not obtainable.

Having described the invention, we claim:

1. A composite frame for a bicycle and the like vehicle having a unitary web for the interior of the frame structure, the web consisting of a top bar, a bottom bar and a pair of bars connecting the top and bottom bars, said bars each comprised of laminations of non-metallic material in solid bonded union, the laminations of the several bars all in a similar plane adapting the bars to be united in structural correspondence and in fabricated continuance one with the other and binding strips of solid material covering the edges of the laminations and in mortise joint connection with the laminations as a unit.

2. A composite frame for a bicycle and the like vehicle having a unitary web for the interior of the frame structure, the web consisting of a top bar, a bottom bar and a pair of bars connecting the top and bottom bars, the web comprising laminations of non-metallic material in solid bonded union with the laminations all in a similar plane and in a vertical plane for the frame and binding means of solid material covering the edges of the laminations and in mortise joint connection with the laminations as a unit.

3. A composite frame for a bicycle and the like vehicle having a unitary web for the interior of the frame structure, the web consisting of a top bar, a bottom bar and a pair of bars connecting the top and bottom bars, said bars each comprised of laminations of non-metallic material in solid bonded union, the laminations of the bars united one with another in fabricated continuance and binding means of solid material covering the edges of the laminations and in mortise joint connection with the laminations as a unit.

4. A composite frame for a bicycle and the like vehicle having a web of composite structure for the interior of the frame and consisting of a top bar, a bottom bar and a pair of bars connecting said top and bottom bars, the web constructed of laminations of non-metallic material extending in a similar plane and in solid bonded union and binding means of solid material covering the edges of the laminations and in mortise joint connection with the laminations as a unit.

5. A composite frame for a bicycle and the like vehicle having a web of composite structure for the interior of the frame and consisting of a top bar, a bottom bar and a pair of bars connecting said top and bottom bars, the web constructed of laminations of non-metallic material extending in a similar plane and in solid bonded union, binding means of solid material covering the edges of the laminations, and in mortise joint connection with the web and a pair of spaced limbs providing a wheel journalling fork for one end of the frame, the limbs each of composite structure extending respectively relatively from opposite sides of the web and from the top and bottom bars thereof and forming a composite part of said bars.

6. A composite frame for a bicycle and the like vehicle, having a web of composite structure for the interior of the frame, fabricated of laminations of non-metallic material extending in a similar plane and in solid bonded union, the web comprising a top bar, a bottom bar and a pair of bars connecting said top and bottom bars, strips respectively extending longitudinally of the bars for transverse reinforcement thereof and in mortise joint connection therewith and veneering adhesively secured to the strips and therewith housing the web bar and giving a definite contour to the bar.

7. A composite frame for a bicycle and the like vehicle having a core composed of laminations in bonded union and extending in a vertical plane of the frame, and binding means of solid material covering the edges of the laminations, extending longitudinally thereof, and the laminations, as a unit, in tongue and groove connection and bonded union with said binding means.

WILLARD C. HESS.
SAMUEL GLUECK.